(12) United States Patent
Dettinger et al.

(10) Patent No.: US 8,131,744 B2
(45) Date of Patent: Mar. 6, 2012

(54) WELL ORGANIZED QUERY RESULT SETS

(75) Inventors: Richard D. Dettinger, Rochester, MN (US); Daniel P. Kolz, Rochester, MN (US); Richard J. Stevens, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1921 days.

(21) Appl. No.: 11/016,202

(22) Filed: Dec. 17, 2004

(65) Prior Publication Data

US 2006/0136382 A1 Jun. 22, 2006

(51) Int. Cl.
G06F 7/00 (2006.01)
G06F 17/30 (2006.01)

(52) U.S. Cl. .................................. 707/760; 707/771

(58) Field of Classification Search .................. None
See application file for complete search history.

(56) References Cited

U.S. PATENT DOCUMENTS

| | | | |
|---|---|---|---|
| 5,345,586 A | 9/1994 | Hamala et al. | |
| 5,404,510 A | 4/1995 | Smith et al. | |
| 5,412,804 A | 5/1995 | Krishna | |
| 5,418,950 A | 5/1995 | Li et al. | |
| 5,471,611 A | 11/1995 | McGregor | |
| 5,515,488 A | 5/1996 | Hoppe et al. | |
| 5,630,121 A | 5/1997 | Braden-Harder et al. | |
| 5,734,887 A | 3/1998 | Kingberg et al. | |
| 5,761,654 A | 6/1998 | Tow | |
| 5,809,497 A | 9/1998 | Freund et al. | |
| 5,918,232 A | 6/1999 | Pouschine et al. | |
| 5,999,933 A | 12/1999 | Mehta | |
| 6,003,034 A | 12/1999 | Tuli | |
| 6,009,422 A | 12/1999 | Ciccarelli | |
| 6,061,506 A | 5/2000 | Wollaston et al. | |
| 6,233,586 B1 | 5/2001 | Chang et al. | |
| 6,377,943 B1 | 4/2002 | Jakobsson | |
| 6,397,223 B1 | 5/2002 | Kori | |
| 6,442,543 B1 | 8/2002 | Snodgrass et al. | |
| 6,457,009 B1 | 9/2002 | Bollay | |
| 6,460,043 B1 | 10/2002 | Tabbara et al. | |
| 6,513,041 B2 | 1/2003 | Tarin | |
| 6,553,368 B2 | 4/2003 | Martin et al. | |
| 6,567,802 B1 | 5/2003 | Popa et al. | |

(Continued)

OTHER PUBLICATIONS

Dettinger, et al.,IBM U.S. Appl. No. 10/083,075, "Application Portability and Extensibility Through Database Schema and Query Abstraction", filed Feb. 26, 2002.

(Continued)

Primary Examiner — Tim T Vo
Assistant Examiner — Thomas Meng
(74) Attorney, Agent, or Firm — Patterson & Sheridan LLP

(57) ABSTRACT

Methods, apparatus, and articles of manufacture for processing an abstract query and generating well organized user results are disclosed. Well organized user results preserve the cardinality of one-to-one and one-to-many between data elements retrieved using a database query. Embodiments of the present invention use an abstract database that separates a user from the physical representation of data stored in a data repository by providing a plurality of logical fields based on the substantive information stored in the underlying data repository. During query processing, query results generated from an abstract query are generated and organized according to the one-to-one and one-to-many relationships. Subsequently, query results are presented to users according to the intuitive relationships between data understood by users of an abstract database.

9 Claims, 9 Drawing Sheets

U.S. PATENT DOCUMENTS

| | | | |
|---|---|---|---|
| 6,601,065 B1 | 7/2003 | Nelson et al. | |
| 6,609,123 B1 | 8/2003 | Cazemier et al. | |
| 6,643,633 B2* | 11/2003 | Chau et al. | 707/1 |
| 6,651,055 B1 | 11/2003 | Kilmer et al. | |
| 6,725,225 B1 | 4/2004 | Kori | |
| 6,725,227 B1 | 4/2004 | Li | |
| 6,820,076 B2 | 11/2004 | Bailey et al. | |
| 6,954,748 B2 | 10/2005 | Dettinger et al. | |
| 6,978,324 B1 | 12/2005 | Black | |
| 6,985,912 B2 | 1/2006 | Mullins et al. | |
| 6,996,558 B2 | 2/2006 | Dettinger et al. | |
| 7,146,376 B2 | 12/2006 | Dettinger et al. | |
| 7,249,118 B2 | 7/2007 | Sandler et al. | |
| 7,333,981 B2 | 2/2008 | Dettinger et al. | |
| 7,363,287 B2 | 4/2008 | Kilmer et al. | |
| 7,526,471 B2 | 4/2009 | Dettinger et al. | |
| 7,539,662 B2 | 5/2009 | Dettinger et al. | |
| 7,805,435 B2 | 9/2010 | Dettinger et al. | |
| 2002/0026630 A1 | 2/2002 | Schmidt et al. | |
| 2002/0078008 A1* | 6/2002 | Cambot et al. | 707/1 |
| 2002/0078068 A1 | 6/2002 | Krishnaprasad et al. | |
| 2002/0091702 A1 | 7/2002 | Mullins | |
| 2002/0091990 A1 | 7/2002 | Little et al. | |
| 2002/0116357 A1 | 8/2002 | Paulley | |
| 2003/0046390 A1 | 3/2003 | Ball et al. | |
| 2003/0120665 A1 | 6/2003 | Fox et al. | |
| 2003/0167274 A1 | 9/2003 | Dettinger et al. | |
| 2003/0172056 A1* | 9/2003 | Dettinger et al. | 707/3 |
| 2003/0214525 A1 | 11/2003 | Esfahany | |
| 2003/0217033 A1 | 11/2003 | Sandler et al. | |
| 2004/0039736 A1 | 2/2004 | Kilmer et al. | |
| 2004/0039820 A1 | 2/2004 | Colby et al. | |
| 2004/0088292 A1 | 5/2004 | Dettinger et al. | |
| 2004/0148278 A1 | 7/2004 | Milo et al. | |
| 2004/0158567 A1 | 8/2004 | Dettinger et al. | |
| 2004/0199524 A1* | 10/2004 | Rys et al. | 707/100 |
| 2004/0254939 A1 | 12/2004 | Dettinger et al. | |
| 2004/0260675 A1 | 12/2004 | Bruno et al. | |
| 2004/0260685 A1 | 12/2004 | Pfleiger et al. | |
| 2004/0260691 A1 | 12/2004 | Desai et al. | |
| 2004/0260706 A1 | 12/2004 | Anonsen et al. | |
| 2004/0267760 A1 | 12/2004 | Brundage et al. | |
| 2005/0076015 A1 | 4/2005 | Dettinger et al. | |
| 2005/0193114 A1 | 9/2005 | Colby et al. | |
| 2006/0010127 A1 | 1/2006 | Dettinger et al. | |
| 2006/0136469 A1 | 6/2006 | Dettinger et al. | |
| 2008/0071760 A1 | 3/2008 | Dettinger et al. | |
| 2008/0091668 A1 | 4/2008 | Dettinger et al. | |
| 2009/0182708 A1 | 7/2009 | Dettinger et al. | |

OTHER PUBLICATIONS

IBM U.S. Appl. No. 10/932,709, "Cartesian Product Detection", filed Sep. 2, 2004.

Dettinger, et al., IBM U.S. Appl. No. 11/005,418, "Abstract Query Plan", filed Dec. 6, 2004.

Dettinger, et al., IBM U.S. Appl. No. 10/403,356, "Dealing with Composite Data Through Data Model Entities", filed Mar. 31, 2003.

Batory et al., "Implementing a Domain Model for Data Structures1,2," International Journal of Software Engineering and Knowledge Engineering, Sep. 1992, vol. 2(3): pp. 375-402.

Calmet et al., "A generic query-transaction framework for a mediator architecture," Proceedings of the 13th International Conference on Data Engineering, Apr. 1997: pp. 434-443.

Tzy-Hey Chang and Edward Sciore, A universal Relation Data Model with Semantic Abstractions, IEEE Transactions on Knowledge and Data Engineering, vol. 4, No. 1, pp. 23-33, Feb. 1992, IEEE Computer Society, USA.

Franconi et al., "A Data Warehouse Conceptual Data Model for Multidimensional Aggregation," Proceedings of the International Workshop on Design and Management of Data Warehouses (DMDW '99), 1999: pp. 13-1 - 13-10.

Llama, "Search Code: Search Your Database," <http://www.codewalkers.com/c/a/Search-Code/Search-Your-Database/>, Jan. 18, 2002, pp. 1-4.

Meng et al., "A Theory of Translation From Relational Queries to Hierarchical Queries," IEEE Transactions on Knowledge and Data Engineering, Apr. 1995, vol. 7(2): pp. 228-245.

Shinichi Morishita, Avoiding Cartesian Products for Multiple Joins, Journal of the ACM, vol. 44, No. 1, Jan. 1997, pp. 57-85, Association for Computing Machinery, USA.

Terry Purcell, Star Join Optimization in DB2, Search400.com, pp. 1-9, http://search400.techtarget.com/tip/0,289438,sid3_gci1072305,00.html, accessed Jun. 18, 2008.

Susan D. Urban et al., Delta Abstractions: A Technique for Managing Database States in Runtime Debugging of Active Database Rules, IEEE Transactions on Knowledge and Data Engineering, vol. 15, No. 3, pp. 597-612, May/Jun. 2003, IEEE Computer Society, USA.

* cited by examiner

548

| DATA REPOSITORY ABSTRACTION COMPONENT |
|---|
| Field<br>  Name = "Patient ID"<br>  Access Method = "Simple"<br>    Table = "Demographics"<br>    Column = "PID" |
| Field<br>  Name = "Name"<br>  Access Method = "Composed"<br>    Expression = "Last Name+First Name" |
| Field<br>  Name = "Glucose Test"<br>  Access Method = "Filtered"<br>    Table = "Tests"<br>    Column = "Test_Result"<br>    Filter = "Test_Type = 3" |
| Field<br>  Name = "Insulin Test"<br>  Access Method = "Filtered"<br>    Table = "Tests"<br>    Column = "Test_Result"<br>    Filter = "Test_Type = 6" |
| Relations |
| Patient ID [ID] (1) --> Name [ID] (1)<br>Patient ID [ID] (1) --> Glucose Test [ID] (many)<br>Patient ID [ID] (1) --> Insulin Test [ID] (many) |

WELL ORGANIZED QUERY RESULT SETS

CROSS-REFERENCE TO RELATED APPLICATIONS

This application is related to a commonly assigned, co-pending U.S. patent application Ser. No. 10/083,075, filed Feb. 26, 2002, entitled "Application Portability and Extensibility through Database Schema and Query Abstraction" which is incorporated herein by reference in its entirety. This application is also related to commonly owned co-pending U.S. patent application Ser. No., 10/932,709, filed Sep. 2, 2004, entitled "Cartesian Product Detection," which is incorporated by reference herein in its entirety. This application is also related to commonly assigned, U.S. Patent Application entitled "Field to Field Join Constraints", filed herewith, commonly assigned, U.S. Patent Application entitled "Abstract Query Plan", Ser. No. 11/005,418, filed Dec. 6, 2004, commonly assigned, U.S. Patent Application entitled "Creating a Logical Table from Multiple Differently Formatted Physical Tables Having Different Access Methods", filed herewith and commonly assigned, U.S. Patent Application entitled "Transformation of an SQL Query into an Abstract Query", filed herewith, which are incorporated herein by reference in their entirety. This application is also related to commonly assigned, U.S. Patent Application entitled "Dealing with Composite Data Through Data Model Entities," application Ser. No. 10/403,356, filed on Mar. 31, 2003 and incorporated herein by reference in its entirety.

BACKGROUND OF THE INVENTION

1. Field of the Invention

The present invention generally relates to data processing. More specifically, embodiments of the invention provide systems and methods for performing complex data queries and organizing query result data into well organized result sets.

2. Description of Related Arts

Databases are computerized information storage and retrieval systems. A relational database management system is a computer database management system (DBMS) that uses relational techniques for storing and retrieving data. The most prevalent type of database is the relational database, a tabular database in which data is defined so that it can be reorganized and accessed in a number of different ways.

Regardless of the particular architecture, in a DBMS, a requesting entity (e.g., an application, operating system or user) requests access to a specified database by issuing a database access request. Such requests may include, for instance, simple catalog lookup requests or transactions and combinations of transactions that operate to read, change and add specified records in the database. Typically, these requests are made using low-level query languages such as the Structured Query Language (SQL). Illustratively, SQL is used to build queries that retrieve and update data stored in a relational database. Examples of relational databases include International Business Machines' (IBM) DB2®, Microsoft's® SQL Server, and database products from Oracle®, Sybase®, and Computer Associates®. The term "query" denominates a set of commands for retrieving data from a stored database. Queries take the form of a command language that lets programmers and programs select, insert, update, determine, and so forth from the data in a database.

One of the issues faced by data mining and database query applications, in general, is their close relationship with a given database schema (e.g., a relational database schema). This relationship makes it difficult to support an application as changes are made to the corresponding underlying database schema. Further, this relationship inhibits migrating the application to alternative underlying data representations. These disadvantages are largely due to the reliance applications have on SQL, which presumes that a relational model is used to represent information being queried. Furthermore, a given SQL query is dependent upon a particular relational schema since specific database tables, columns, and relationships are referenced within the SQL query representation. As a result of these limitations, a number of difficulties arise.

One difficulty is that changes in the underlying relational data model require changes to the SQL foundation upon which the corresponding application is built. Therefore, an application designer must either forgo changing the underlying data model to avoid application maintenance or must change the application to reflect changes in the underlying relational model. Another difficulty is that extending an application to work with multiple relational data models requires separate versions of the application to reflect the unique SQL requirements of each relational schema. Yet another difficulty is evolution of the application to work with alternate data representations because SQL is designed for use with relational systems. Extending the application to support alternative data representations, such as XMLQuery, requires rewriting the application's data management layer to use non-SQL data access methods.

To address these difficulties a data abstraction layer may be used to separate a user from the underlying physical representation of a database (e.g., SQL schema). The data abstraction layer may be interposed between an application and the underlying physical database system. Detailed examples of a data abstraction layer are described in a commonly owned application "Application Portability and Extensibility Through Database Schema and Query Abstraction," Ser. No. 10/083,075, filed Feb. 26, 2002, incorporated herein by reference in its entirety. Commonly assigned, U.S. Patent Application filed herewith entitled "Abstract Query Plan", Ser. No. 11/005,418, filed Dec. 6, 2004 discloses techniques for processing an abstract query that include generating an intermediate representation of an abstract query then used to generate a resolved query. The embodiments disclosed in the foregoing patent applications provide a data abstraction layer that defines a set of logical fields corresponding to users' substantive view of data that are loosely coupled to the underlying physical databases storing the data. The logical fields are available for a user to compose abstract queries that are transformed into physical queries configured to search, retrieve, add, and modify data stored in the underlying physical databases.

In some cases, the underlying physical databases being accessed are relational databases. Relational databases store data in tabular data structures, and a query may retrieve data from multiple tables according to conditions specified in the query. The query may also specify how to join the data from multiple tables into a single set of results. Oftentimes, however, the joined results may be "flattened" to form a set of rows in a table format. The relationships reflected in the query results are, however, really hierarchal relationships between data elements. For example, consider an abstract query configured to retrieve data from a relational database storing patient names and medical test results. A query that retrieves all patients ID's, their name, and the results form medical tests might generate results similar to the following:

| Patient ID | Last Name | Test Results |
|---|---|---|
| 1 | Smith | 23 |
| 1 | Smith | 28 |
| 1 | Smith | 21 |
| 2 | Jones | 33 |
| 2 | Jones | 35 |

Although the above table does convey all the requested information, it does so awkwardly. Specifically, the one-to-many relationship between patients with multiple test results is lost. In its place is a separate listing for each test, and the patient ID and last names becomes duplicated accordingly. Addressing this problem is not simply a matter of removing duplicate values or data formatting. For example, if in addition to retrieving "test results" the query included a patients' age, then a statistical analysis routine used to compute an average age from query results would be skewed by the number of repeated age values included for the same individual. Again, this problem occurs because the cardinality of the relationships between data elements is list, or "flattened out" by the row structure of the query results. In both of these cases, the desired query results should preserve the one-to-one and one-to-many relationships, such as the above query results presented below in a well-organized format:

| Patient ID | Last Name | Test Results |
|---|---|---|
| 1 | Smith | 23 |
|   |       | 28 |
|   |       | 21 |
| 2 | Jones | 33 |
|   |       | 35 |

Accordingly, there remains a need to provide users of an abstract database with well organized query results suited for presenting data in a format that preserves both one-to-one and one-to-many relationships for display or for additional processing.

SUMMARY OF THE INVENTION

Embodiments of the invention provide for results generated for an abstract query that are well organized when used to convey information. A user may be an individual interacting with a query application, i.e., selecting abstract queries for execution against the data abstraction layer or a software component configured to retrieve and analyze data from the abstract database. One embodiment of the invention provides a method of processing an abstract query. The method generally includes receiving, from a requesting an entity, an abstract query composed from a plurality of logical fields, wherein each logical field specifies (i) a name used to identify the logical field, and (ii) an access method that maps the logical field to data in an underlying database. The method generally further includes, generating a well organized data query structure that indicates the one-to-one and one-to-many relationships among the plurality of logical fields included in the abstract query, retrieving a set of query results for the abstract query from the underlying database, and transforming the set of query results into a well organized set of query results according to the one-to-one and one-to-many relationships reflected by the well organized data structure.

Another embodiment of the invention provides a system for providing well organized query results. The system generally includes an abstract data layer that provides a set of logical fields used to compose an abstract query composed from the set of logical fields, wherein each logical field specifies (i) a name used to identify the logical field, (ii) an access method that maps the logical field to data in an underlying data source. The system generally further includes a runtime component configured (i) to generate, in response to receiving an abstract query, a well organized result structure that reflects the one-to-one and one-to-many relationships among logical fields included in the abstract query; (ii) to retrieve a set of query results for the abstract query from the data source, and (iii) to transform the set of query results in a well organized set of query results, and an output formatter configured to format the well organized set of query results.

Another embodiment of the invention provides computer-readable medium containing a program which, when executed by a processor, performs operations. The operations generally include includes receiving, from a requesting an entity, an abstract query composed from a plurality of logical fields, wherein each logical field specifies (i) a name used to identify the logical field, and (ii) an access method that maps the logical field to data in an underlying database. The method generally further includes, generating a well organized data structure that indicates the one-to-one and one-to-many relationships among the plurality of logical fields included in the abstract query, retrieving a set of query results for the abstract query from the underlying database, and transforming the set of query results into a well organized set of query results according to the one-to-one and one-to-many relationships reflected by the well organized data structure.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

Note, however, that the appended drawings illustrate only typical embodiments of the invention and are, thus not to be considered limiting of its scope, for the invention may admit to other equally effective embodiments.

DETAILED DESCRIPTION OF THE PREFERRED EMBODIMENTS

Figure 1:
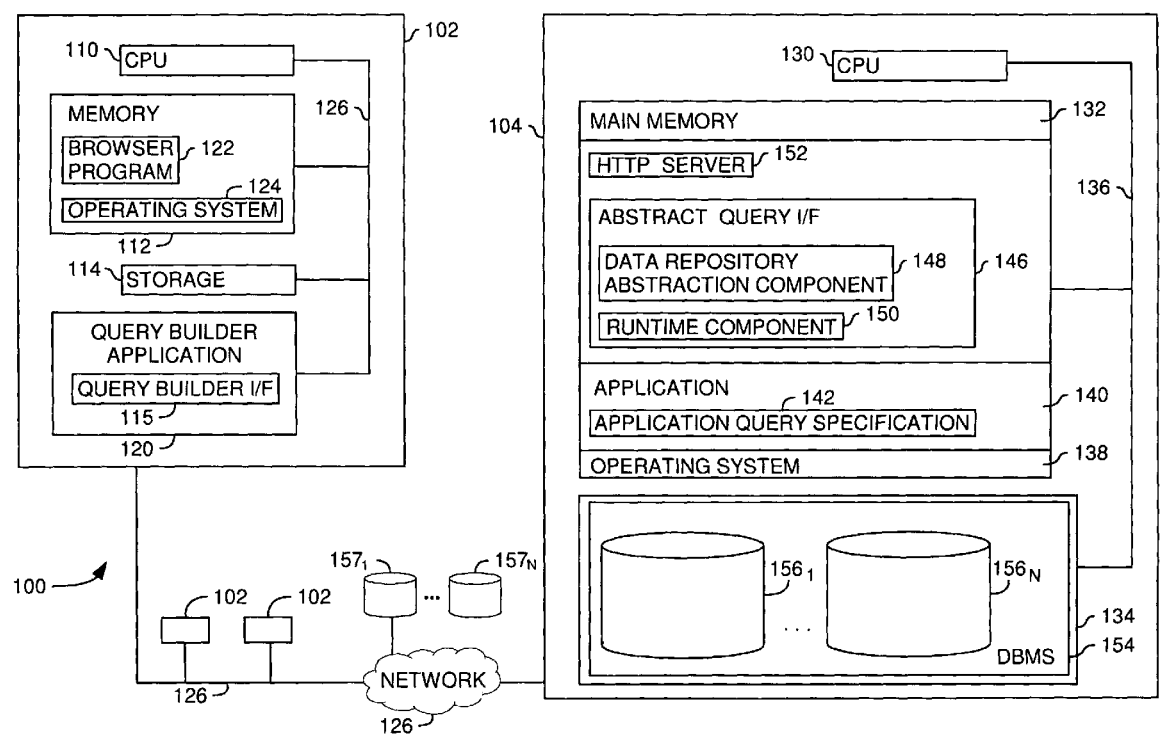
FIG. 1 illustrates a networked computing system, according to one embodiment of the invention.

Embodiments of the present invention provide methods, systems, and articles of manufacture used to create a set of well organized user results as part of processing an abstract query. In one embodiment, the abstract query is used to generate an intermediate representation of the abstract query, such as an abstract query plan. Generally, an abstract query plan includes a combination of both logical elements of from a data abstraction model, and physical elements from an underlying physical database system. This intermediate representation is used to generate a resolved query that may be executed against the underlying database.

In one embodiment, the abstract query plan may be used to generate multiple sub queries, or may be used to generate a single resolved query, and may also be used to construct a well organized results data structure. This data structure uses the intermediate representation to preserve one-to-one and one-to-many relationships between the data elements returned as query results. The data structure is used to merge and format the results from each sub-query for display to a user. In a particular embodiment, query results are marked up according to the well-organized data structure using HTML (or other markup language) and rendered to a user interacting with the query system using a web-browser. Additionally, well organized query results may be used as input to other processes, such as statistical analysis programs configured to analyze query results.

In one embodiment, users compose an abstract query using a set of logical fields defined by a data abstraction layer. The data abstraction layer provides users with an abstract view of the data available to query (e.g., search, select, and modify). The data itself is stored in a set of underlying physical databases using a concrete physical representation (e.g., a relational database). The physical representation may include a single data source, or may comprise many data sources accessible over computer networks. The data abstraction layer provides a logical view of one or more such underlying data sources that is independent of the particular manner of data representation. Where multiple data sources are provided, each logical field is configured to include a location specification identifying the location of the data to be accessed. A runtime component is configured to resolve an abstract query into a resolved query (or multiple resolved sub queries) that can be issued against the underlying physical data repositories.

In this description, reference is made to embodiments of the invention. The invention is not, however, limited to any specifically described embodiment. Rather, any combination of the following features and elements, whether related to a described embodiment or not, implements and practices the invention. Furthermore, in various embodiments the invention provides numerous advantages over the prior art. Although embodiments of the invention may achieve advantages over other possible solutions and the prior art, whether a particular advantage is achieved by a given embodiment does not limit the scope of the invention. Thus, the following aspects, features, embodiments and advantages are illustrative and are not considered elements or limitations of the appended claims except where explicitly recited in a claim. Likewise, references to "the invention" shall neither be construed as a generalization of any inventive subject matter disclosed herein nor considered an element or limitation of the appended claims except where explicitly recited in a claim.

One embodiment of the invention is implemented as a program product for use with a computer system such as, for example, the computer system 100 shown in FIG. 1 and described below. The program product defines functions of the embodiments (including the methods) described herein and can be contained on a variety of signal-bearing media. Illustrative signal-bearing media include, without limitation, (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed across communications media, (e.g., a computer or telephone network) including wireless communications. Embodiments (i) and (ii) represent computer readable storage media. The latter embodiment specifically includes information shared over the Internet or other computer networks. Such signal-bearing media, when carrying computer-readable instructions that perform methods of the invention, represent embodiments of the present invention.

In general, software routines implementing embodiments of the invention may be part of an operating system or part of a specific application, component, program, module, object, or sequence of instructions such as an executable script. Such software routines typically comprise a plurality of instructions capable of being performed using a computer system. Also, programs typically include variables and data structures that reside in memory or on storage devices as part of their operation. In addition, various programs described herein may be identified based upon the application for which they are implemented. Those skilled in the art recognize, however, that any particular nomenclature or specific application that follows facilitates a description of the invention and does not limit the invention for use solely with a specific application or nomenclature. Furthermore, the functionality of programs described herein using discrete modules or components interacting with one another. Those skilled in the art recognize, however, that different embodiments may combine or merge such components and modules in many different ways.

Data Abstraction Model: Physical Environment

FIG. 1 depicts a block diagram of a networked system 100 in which embodiments of the present invention may be implemented. In general, the networked system 100 includes a client computer 102 (three such computers 102 are shown) and at least one server computer 104. The client computer 102 and the server computer 104 are connected via a network 126. In general, the network 126 may be a local area network (LAN) and/or a wide area network (WAN). In a particular embodiment, the network 126 includes network connections over the Internet.

Generally, each client computer 102 includes a central processing unit (CPU) 110 connected via a bus 130 to a memory 112, storage 114. Storage 114 is preferably a direct access storage device. Typical such devices include IDE, SCSI, or RAID managed hard dive(s). Although shown as a single unit, client computer 102 may comprise a combination of fixed or removable storage devices, including fixed disk drives, floppy disk drives, tape drives, removable memory cards, or optical storage. The memory 112 comprises the internal storage area used by computer 102. Memory 112 includes memory storage devices that typically come in the form of chips (e.g., SDRAM modules, DDR modules, and the like).

Each client computer 102 may include additional components not illustrated in FIG. 1, such as a keyboard, mouse pointer, CD-Rom, USB devices, and other specialized hardware. Further, each client computer 102 is running an operating system, (e.g., a Linux® distribution, Microsoft Windows®, IBM's AIX®, FreeBSD, Mac OSX® and the like) to manage interactions between hardware components and higher-level software applications.

As illustrated, FIG. 1 shows memory 112 containing a browser program 122 that, when executed on CPU 110, provides support for navigating between various servers (e.g. server 104) and sharing data between them. Browser 122 renders data transmitted across network 126 to computer 102 in a presentable form. In one embodiment, the browser program 122 comprises a web-based Graphical User Interface (GUI), which displays Hyper Text Markup Language (HTML) documents. More generally, the browser program 122 may be any GUI-based program capable of rendering the information transmitted from the server computer 104. In addition, memory 112 is illustrated with query builder application 120. Application program 120 may comprise any software program configured to compose, process, and issue abstract queries using a query building interface 115. Alternatively, the query building interface may be presented to a user on browser program 122.

The server computer 104 may be physically similar to the client computer 102. Accordingly, the server computer 104 is shown generally comprising a CPU 130, a memory 132, and a storage device 134, coupled to one another by a bus 136. Also, server computer 104, like client computer 102, may include additional hardware components not illustrated in FIG. 2, such as a keyboard, mouse, CD-Rom, USB devices, display device, and other specialized hardware. More generally, the client computer 102 and server computer 104 are labeled as such due to their respective functions and on the software processes running thereon and not necessarily on any difference in the physical components used to construct each of the computer systems. Further, like client computer 102, server computer 104 is running an operating system, (e.g., a Linux® distribution, Microsoft Windows®, IBM's AIX® or OS/400®, FreeBSD, and the like) to manage interactions between hardware components and higher-level software applications.

As illustrated in FIG. 1, the memory 132 of server computer 104 further includes one or more applications 140 and an abstract query interface 146. The applications 140 and the abstract query interface 146 are software products comprising a plurality of instructions that reside in the storage devices in the computer system 104. Those skilled in the art will recognize that modern, multi-tasking operating systems move different processes between memory 132, storage 134, and CPU 130 as needed to execute applications 140.

When read and executed by one or more processors 130 in the server 104, the applications 140 and the abstract query interface 146 cause the computer system 104 to perform the steps necessary to execute steps or elements embodying the various aspects of the invention. The applications 140 (and more generally, any requesting entity, e.g., users) issue queries against an abstract database. The abstract queries are resolved into queries consistent with the physical representations used to store data e.g., data stored in local databases $156_{1-N}$, and remote databases $157_{1-N}$, collectively referred to as database(s) 156-157). Illustratively, databases 156 is shown as part of a database management system (DBMS) 154 in storage 134. More generally, as used herein, the terms "database" "data source" and "data repository" refers to any collection of data regardless of the particular physical representation. For example, databases 156-157 may be organized according to a relational schema (accessible by SQL queries) or according to an XML schema (accessible by XML queries). As used herein, the term "schema" generically refers to a particular arrangement of data. The invention is not limited, however, to a particular schema and contemplates extension to schemas presently unknown. Rather, one advantage provided by the data abstraction layer is access to an evolving (in terms of schema, location, and accessibility) set of underlying data repositories.

In one embodiment, the queries issued by the applications 140 are defined according to an application query specification 142. The queries issued by the applications 140 may be predefined (i.e., hard coded as part of the applications 140) or may be generated in response to a user interacting with query building interface 115 through application program 120 or browser program 122. In either case, an abstract query is composed using logical fields defined by a data repository abstraction component 148. The abstract queries are executed by a runtime component 150 which transforms the abstract queries into a form consistent with the physical representation of the data contained in one or more of the databases 156-157, and returns results to a requesting entity. The data repository abstraction component 148 and the runtime component are further described below in conjunction with FIGS. 2A-B.

In one embodiment, elements of an abstract query are specified by a user interacting with an application program 125 or browser program 122. The content rendered by these programs may be generated by the application(s) 140. In a particular embodiment, the GUI content is hypertext markup language (HTML) content which may be rendered on the client computer systems 102 with the browser program 122. Accordingly, the memory 132 is shown with a hyper text transfer protocol (HTTP) server process 152 (e.g., a web server such as the open source Apache web-sever program or IBM's WebSphere® program) configured to service requests from the client computer 102. For example, HTTP server 152 may respond to requests to access databases 156, residing on the server 104.

Those skilled in the art will recognize that FIG. 1 illustrates one possible hardware and software configuration for the client computer 102 and server computer 104, and that embodiments of the present invention can use to other configurations, regardless of whether the computer systems are complicated, multi-CPU computing systems, single-user workstations, or network appliances. Additionally, it is understood that where reference is made to particular markup languages, including HTML, the invention is not limited to a particular language, standard or version. Persons skilled in the art will recognize that the invention is adaptable to other markup languages and that the invention is also adaptable future changes in a particular markup language as well as to other languages presently unknown. Likewise, the HTTP server process 152 shown in FIG. 1 is merely illustrative and other embodiments adapted to support known and unknown protocols for data communications between computer systems are contemplated.

Data Abstraction Model: Logical Environment

Figure 2A:
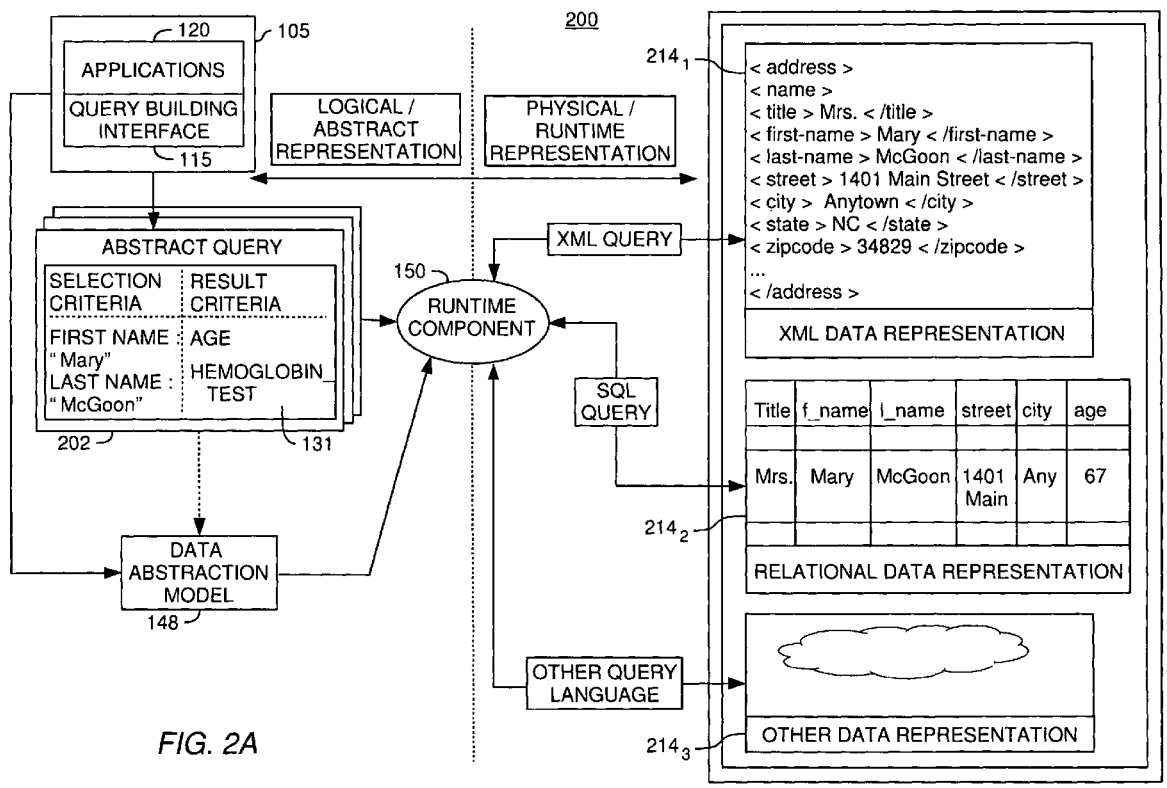
FIG. 2A illustrates a relational view of software components including the relationships between a runtime component, data abstraction layer, and underlying physical database systems, according to one embodiment of the invention.

FIG. 2A illustrates a plurality of interrelated components of the invention, along with the transformation between the abstract view provided by the data abstraction model data (the left side of FIG. 2A), and the physical mechanism used to store data (the right side of FIG. 2A).

In one embodiment, a requesting entity (e.g., a user interacting with application 115 executing on client system 105) composes an abstract query 202 using query building interface 115. The query building interface 115 may be provided by the application 115, or may be a part of web-page rendered on web browser 122. The resulting query is generally referred to herein as an "abstract query" because it is composed from logical fields rather than by direct references to data entities in underlying databases 214$_{1,3}$. Thus, abstract queries may be composed independently from the particular underlying data representation (e.g., a relational database schema).

Figure 2B:
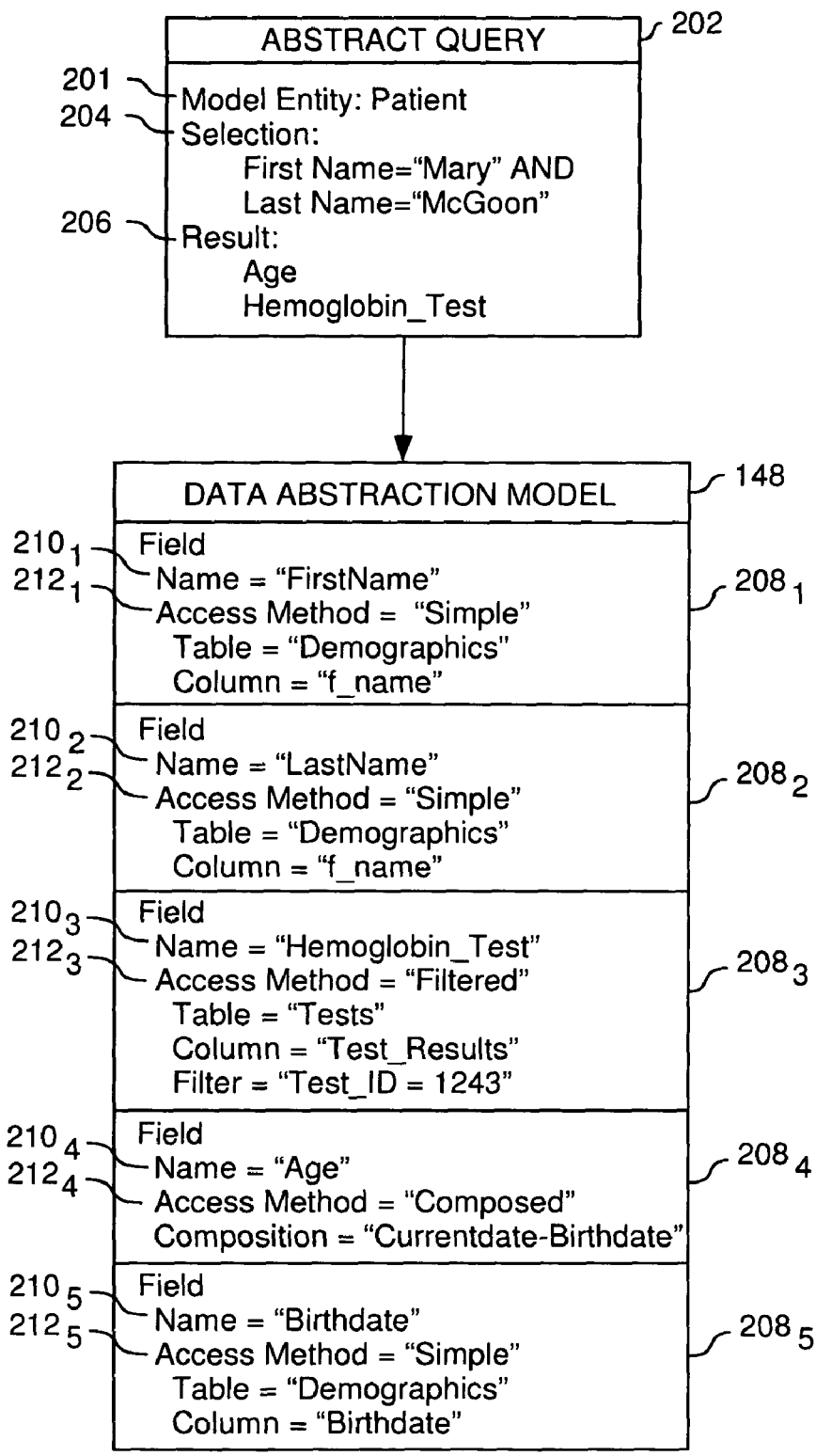
FIG. 2B illustrates an abstract query and corresponding data repository abstraction component, according to one embodiment of the invention.

FIG. 2B illustrates an exemplary abstract query 202. The query includes selection criteria 204 designed to retrieve information about a patient named "Mary McGoon." The particular information to be retrieved is specified by result criteria 206. In this example, the query 202 retrieves an age and test results for a hemoglobin test. The actual data retrieved may include test results from multiple hemoglobin multiple tests. That is, the query results may exhibit a one-to-many relationship between the named patient and the test results for the patient. In constructing a well-organized user result set, the runtime component 150 preserves these relationships present in the query results when displaying information to a user.

In addition, abstract query 202 specifies a model entity 201. As illustrated, a "patient" model entity. Generally, model entities provide an additional layer of abstraction representing a composite of individual logical fields. Model entities provide end users and applications a higher level conceptual view that can simplify data query and modification tasks (i.e., insert, search, and deletion). Model entities identify the focus or perspective for a particular abstract query. In other words, the model entity serves to identify broad categories of data, such as a "patient" data. Rather than query tests, results, and fields, users compose a query of the model entity, e.g., a patient. The "patient" model entity specified in abstract query 202 identifies a group of logical fields all related to the "patient."

In one embodiment, a user specifies what model entity is being queried as part of the query building process. The model entitles that are available are provided by the data abstraction model 148. As described below, the runtime component 150 may use the model entity selected for a logical field to select a root node when constructing an abstract query plan. In one embodiment, model entities are defined by additional metadata included in the data abstraction model 148. Model entities are described in further detail in a commonly owned, co-pending application entitled "Dealing with Composite Data through Data Model Entities," application Ser. No. 10/403,356 filed on Mar. 31, 2003 and incorporated herein by reference in its entirety.

FIG. 2B also illustrates one embodiment of a data abstraction model 148 that includes a plurality of logical field specifications 208$_{1-5}$ (five shown by way of example). Collectively, logical field specifications 208 create an abstraction layer over a set of underlying physical databases and schema. Those skilled in the art will recognize that multiple data repository abstraction models may be constructed over the same set of underlying physical storage mechanisms. Accordingly, abstractions may be constructed to expose different portions of data to different users, or abstractions constructed over the same data may differ, and may be customized to the needs of a particular user (or group of users).

The logical fields shown in FIG. 2B illustrate an abstraction constructed over a relational database. Field specifications 208 specify a mapping between the logical fields and the tables and columns from a relational database (e.g., database 214$_2$ from FIG. 2A). The data abstraction model 148 provides a logical field specification 208 for each logical field available for composing an abstract query (e.g., abstract query 202).

Logical field specifications 208 store a definition for each logical field, and any associated metadata. As illustrated, each field specification 208 identifies a logical field name 210$_{1-5}$ and an associated access method 212$_{1-5}$. Depending upon the number of different types of logical fields, any number of access methods is contemplated. As illustrated in FIG. 2B, access methods for simple fields, filtered fields, and composed fields are provided.

Field specifications 208$_1$, 208$_2$ and 208$_5$ each define a simple access method 212$_1$, 212$_2$, and 212$_5$. The simple access method provides a direct mapping to a particular entity in the underlying physical data representation. When this is a relational database, the simple access method maps the logical field to an identified database table and column. For example, the simple field access method 212$_1$ maps the logical field name 210$_1$ ("FirstName") to a column named "f_name" in a table named "Demographics." The logical field specification 208 may also include metadata indicating how the logical field is related to other entities in the data abstraction model 148.

Field specification 208$_3$ exemplifies a filtered field access method 212$_3$. Filtered fields identify an associated data source and provide rules used to define a particular subset of items within the data source. Consider, for example, a relational table storing test results for a plurality of different medical tests. Logical fields corresponding to each different test may be defined, and the filter for each different test is used to identify a particular test is associated with a logical field. For example, the access method for filtered field 212$_3$ maps the logical field name 210$_3$ ("Hemoglobin Test") to a physical entity in a column named "Test_Result" in a table named "Tests." The access method also defines a filter of "Test_ID='1243.' Accordingly, the filtered field acts as selection criteria used to restrict items from a larger set of data, without the user having to know the specifics of how the data is represented in the underlying physical database.

Field specification 208$_4$ exemplifies a composed access method 212$_4$. Composed access methods generate values from one or more physical data items, or data returned by other logical fields, using an expression supplied as part of the access method definition. In this way, information which does not directly exist in the underlying data representation may be computed and provided to a requesting entity. In the example illustrated in FIG. 2B the composed field access method 212$_3$ maps the logical field "Age" to another logical field 208$_5$ named "birth date." The logical field "birthdate" 210$_5$ maps to a column in the demographics table. The composition expression is used to compute a value for the composed field. In this example, an age value is computed by subtracting the current date from the birth date value returned by the "birth date" logical field.

By way of example, the field specifications 208 of the data repository abstraction component 148 shown in FIG. 2B are representative of logical fields mapped to data represented in the relational data representation 214$_2$. However, other instances of the data repository abstraction component 148 or other logical field specifications may map to other physical data representations (e.g., databases 214$_1$ or 214$_3$ illustrated in FIG. 2A).

An illustrative abstract query, corresponding to the abstract query 202 shown in FIG. 2B, is shown in Table I below. In this example, the abstract query 202 is represented using XML. Browser program 122 (or query builder application 120) may be configured to generate an XML document to represent an abstract query composed by a user. Those skilled in the art will recognize that XML is a well known language used to facilitate the sharing of structured text and information, other languages, however, may be used.

TABLE I

Query Example

```
001  <?xml version = "1.0"?>
002  <!--Query string representation: (FirstName = "Mary" AND
003  LastName = "McGoon") OR State = "NC"-->
004  <QueryAbstraction>
005    <Selection>
006      <Condition internalID="4">
007        <Condition field="FirstName" operator="EQ" value="Mary"
008  internalID="1"/>
009        <Condition field="LastName" operator="EQ" value="McGoon"
010  internalID="3" relOperator="AND"></Condition>
011      </Condition>
012    </Selection>
013    <Results>
014      <Field name="Age"/>
015      <Field name="Hemoglobin_test"/>
016    </Results>
017    <Entity name="Patient">
018      <EntityField required="Hard" >
019        <FieldRef name="data://Demographic/Patient ID" />
020        <Usage type="query" />
021      </EntityField>
022    </Entity>
023  </QueryAbstraction>
```

The abstract query shown in Table I includes a selection specification (lines 005-012) containing selection criteria and a results specification (lines 013-016). In one embodiment, a selection criterion consists of a field name (for a logical field), a comparison operator (=, >, <, etc) and a value expression (what is the field being compared to). In one embodiment, the result specification is a list of logical fields that are to be returned as a result of query execution. The actual data returned is consistent with the selection criteria. The model entity "patient" is identified on line 017 and associates the model entity with the patient ID column of the demographic table (line 019).

Abstract Query Processing

Figure 3A:
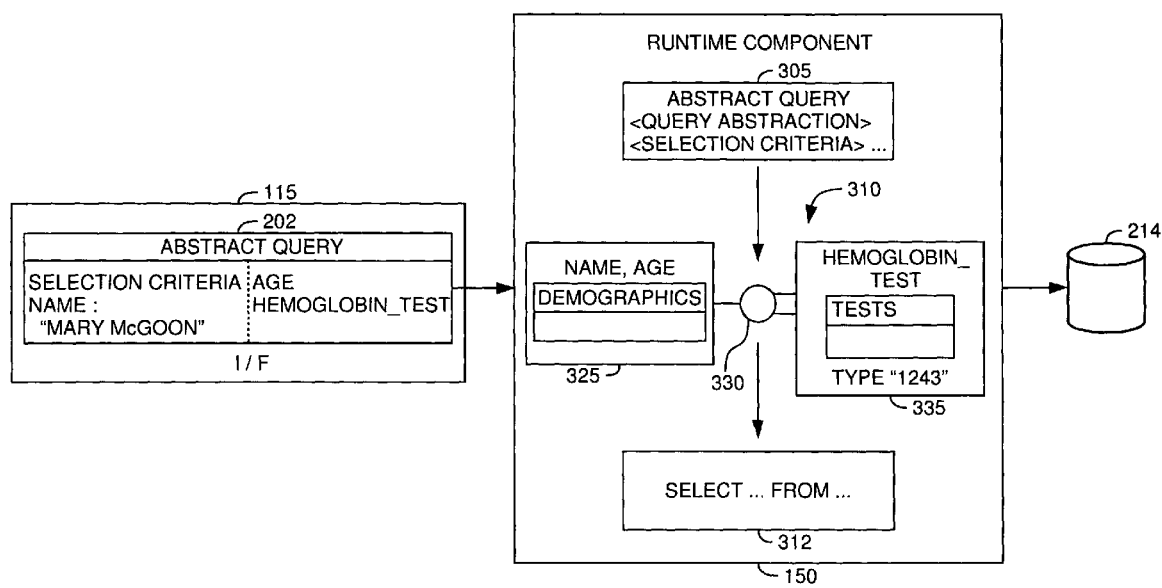
FIG. 3A illustrates a runtime component processing an abstract query that includes the step of creating an intermediate representation of the abstract query subsequently used to create a resolved query, according to one embodiment of the invention.

FIG. 3A further illustrates runtime component 150, according to one embodiment of the invention. As described above, the runtime component 150 is configured to receive an abstract query, and in response, to generate a query of an underlying physical data storage mechanism, such as a relational database. Users may compose an abstract query (e.g., query 202) interacting with query building interface 115. Additionally, queries may be saved, cached, and shared among different users. Once completed and selected for execution, the abstract query is delivered to the runtime component 114. In one embodiment, the query is transmitted across network 104 to system 110 using well-known data communications protocols.

The runtime component 150 processes the abstract query 305. In one embodiment, the runtime component 150 receives the abstract query 305 in a structured form, such as XML, like the query illustrated in Table I. From abstract query 305, the runtime component 150 first builds an intermediate representation of the query. In one embodiment, the abstract query plan includes a combination of abstract elements from the data abstraction model and elements relating to the underlying physical data storage mechanism.

For a data abstraction model constructed over a relational database, an abstract query plan includes all the information about which relational tables need to be available, and how to join the tables together (i.e., the relationships between the tables or between the logical fields, conditions on data retrieved.) Using the abstract query plan, the runtime component generates an SQL statement 312 used to query of database 214. Further examples for generating an abstract query plan are disclosed in a commonly owned, U.S. Patent Application filed herewith entitled "Abstract Query Plan", Ser. No. 11/005,418, filed Dec. 6, 2004 incorporated by reference herein in its entirety.

Figure 3B:
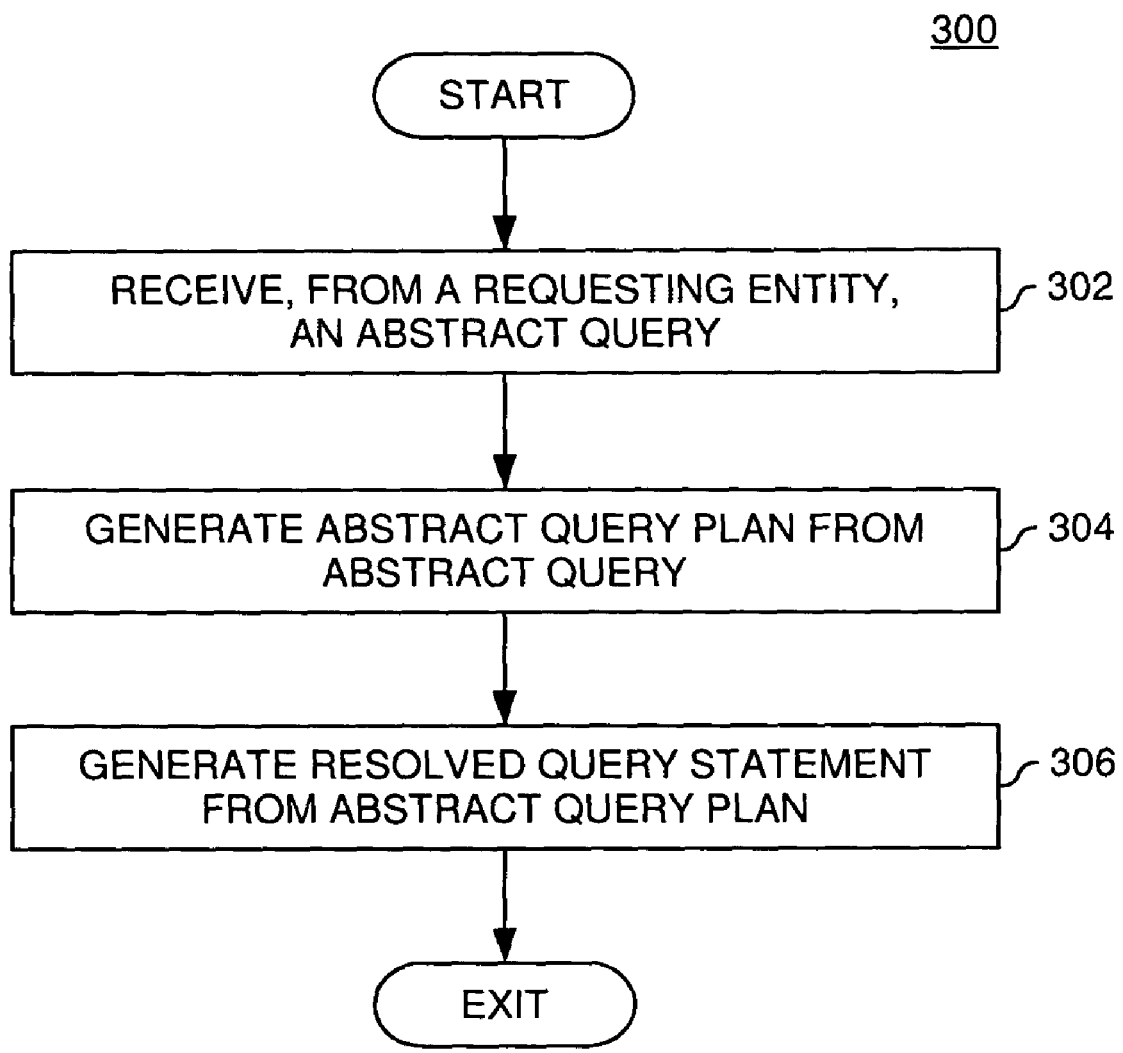
FIG. 3B illustrates an exemplary method to generate a set of well organized user results, according to one embodiment of the invention.

FIG. 3B illustrates operations 300 of the runtime component 150 processing an abstract query, according to one embodiment of the invention. Operations 300 correspond to the transformation illustrated in FIG. 3A of the abstract query 305, intermediate representation 310, and the resolved query 312. The method begins at step 302 wherein the runtime component 150 receives, from a requesting entity, an abstract query. The query is composed using query building interface 115, or may also be a saved query composed earlier. In this way the same abstract query may be used for different underlying databases. That is, the same logical fields may be constructed over different underlying database representations by changing the appropriate logical field specification 208 to reflect a mapping to a different underlying database. The abstraction provided by the logical fields and access methods hides the differences in the underlying systems from the user of the abstract database.

Next, at step 304, the runtime component 150 generates an abstract query plan from the abstract query. In one embodiment, the abstract query plan may include a set of nodes wherein each node identifies an individual data source from the underlying database. The nodes may further indicate all of the logical fields that map to data in the data source identified by a given node, and any conditions specified in the abstract query that are evaluated using data form the data source specified by the node. Finally, the nodes are linked together to form a tree-type data structure that identifies the one-to-one and one-to-many relationships among the logical fields included in the set of nodes.

For example, FIG. 3A illustrates abstract query plan 310 that includes two nodes 325 and 335. The demographics node 325 includes the name and age logical fields from query 202 that map to the demographics table in database 214. Accordingly, node 325 references the demographic table as the data source corresponding to node 325. Also, node 325 is joined to node 310 which includes the hemoglobin test logical field, the tests data source, and a condition used to evaluate data from the table that is included in the query results. Edge 330 indicates that a one-to-many relationship exists between the demographic data and the tests data. This is indicated by the single and double line portions of edge 330 and reflects that one person may have results for many hemoglobin tests.

Once constructed, the runtime component 150 may use the abstract query plan to generate a query consistent with the schema of the underlying database. For example, where the underlying storage mechanism is a relational database, the runtime component 150 generates an SQL statement provided to a relational DBMS for execution. Thus, at step 306, the runtime component 150 may traverse through the abstract query plan, beginning at the model entity root node, to generate a resolved query of the underlying physical database. Alternatively, the runtime component may generate multiple queries, one for each node of the abstract query plan. Once executed, an SQL statement (i.e., a resolved query) will return a set of rows that include the columns specified by the SQL statement. In one embodiment, the runtime component 150 may organize the data retrieved by the resolved query into a set of well organized user results.

Organizing Query Results Data

As part of generating a resolved query from the abstract query, the runtime component 150 may be configured to preserve one-to-one and one-to-many relationships between logical fields while generating a resolved query (e.g., as part of steps 310 and 312 from the method illustrated in FIG. 3A). Subsequently, one-to-one and one-to-many relationships are used to construct a set of well organized query results in response to the abstract query.

Figure 4:
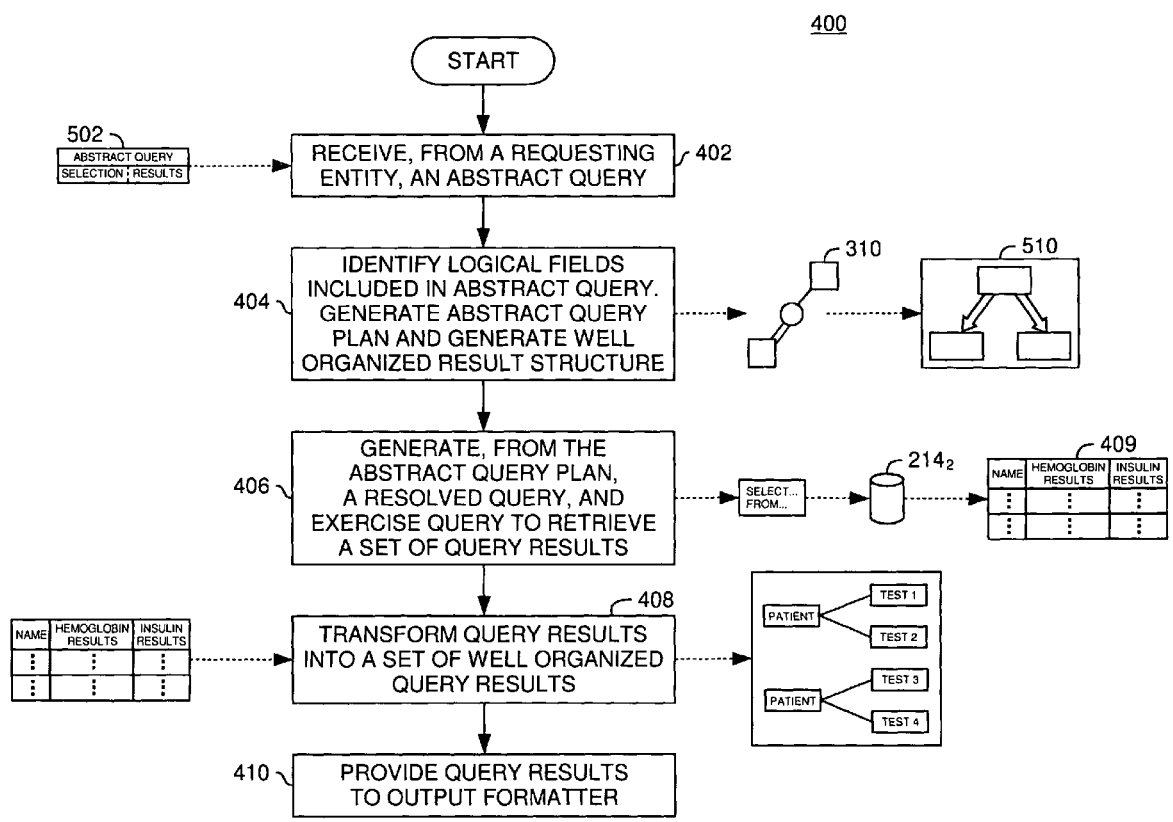
FIG. 4 illustrates a method for processing an abstract query to create a set of well organized user results, according to one embodiment of the invention.

FIG. 4 illustrates a method for processing an abstract query to create well organized results, according to one embodiment of the invention. The method of FIG. 4 is illustrated in conjunction with a description of the objects and data structures illustrated in FIG. 5. By "well-organized," it is meant that the cardinality of relationships among data elements included in the results is preserved. For example, the following table illustrates a "flattened" list that duplicates a last name and patient ID for each discrete test result. The data in Table II corresponds to a set of rows returned from an SQL query issued against a relational database.

TABLE II

| SQL Query Results | | |
|---|---|---|
| Patient ID | Last Name | Test Results |
| 1 | Smith | 23 |
| 1 | Smith | 28 |
| 1 | Smith | 21 |
| 2 | Jones | 33 |
| 2 | Jones | 35 |

By organizing the result data according to the cardinality of the relationships among data elements, then the query results illustrated in Table I may be organized into a form similar to the following table:

TABLE III

| Well-organized Query Results | | |
|---|---|---|
| Patient ID | Last Name | Insulin Test Results |
| 1 | Smith | 23 |
|  |  | 28 |
|  |  | 21 |
| 2 | Jones | 33 |
|  |  | 35 |

The data illustrated in Table III preserves the one-to-many relationships of the data elements (i.e., one patient, many tests). In one embodiment, the output of query processing may be used to display results to a user. For example, HTTP server 152 may be used to generate and transmit the appropriate HTML code to browser program 122. In such a case, the well-organized results data more effectively conveys the substantive information retrieved for the abstract query than the "flattened" results illustrated in Table I.

Constructing well-organized query result data begins at step 402 when the runtime component 150 receives, from a requesting entity, an abstract query with the instruction to process the query and return results data as a set of well-organized results. In one embodiment, a user interacts with query building interface 115 to compose an abstract query. For example, query building interface 115 may allow a user to compose an abstract query by selecting conditional operators and operands and apply them to logical fields (e.g., "and," "or," "nor," and the like) and by specifying what logical fields the user wishes to return as results data.

Figure 5A:
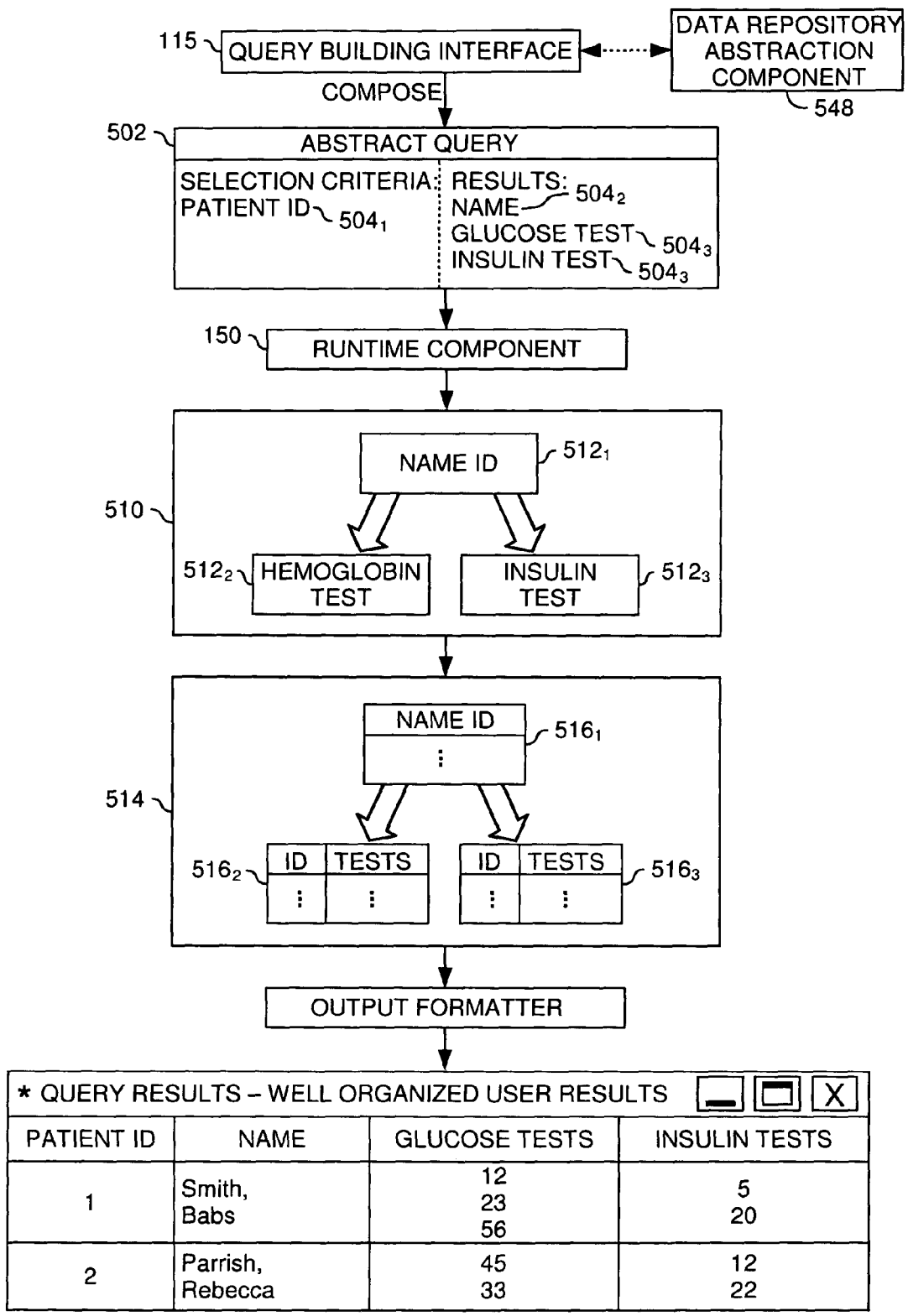
FIG. 5 illustrates an abstract query processed by a runtime component to generate a set of well organized user results, according to one embodiment of the invention.

FIG. 5 illustrates another example of an abstract query 502 composed from logical fields defined in a data repository abstraction component 548. As illustrated, abstract query 502 identifies four logical fields, including a "patient ID" field $504_1$, "name" field $504_2$, a "glucose test" field $504_3$ and an "insulin test" field $504_4$. Abstract query 502 retrieves data similar to the results shown in Table II and Table III, above, but adds a glucose test value to the results. Each of the logical fields $504_{1-4}$ included in abstract query 502 has a corresponding logical field specification 506 in data repository abstraction component 548. After completing an abstract query, the user submits the query to the runtime component 150 for processing (e.g., as part of step 305 of operations 300 illustrated in FIG. 3B).

Abstract query 502 is composed to retrieve information about patients stored in a database. The query retrieves the name (stored in a demographics table) along with the result values of two medical tests, an insulin test and a glucose test (both stored in a tests table). Using this example, some patients may have results data for one test, the other, or both. Further, some patients may have multiple values for the medical tests. That is, the same test may have been administered multiple times to the same individual. Thus, the "patient id" and "name" logical fields should exhibit a one-to-one relationship with respect to each other and a one-to-many relationship with respect to test results for a set of glucose and insulin tests.

Returning to operations 400 illustrated in FIG. 4, at step 402 after receiving an abstract query, the runtime component 150 identifies all of the elements included in the query, and generates abstract query plan 312. At step 404, after generating an abstract query plan 310, the runtime component 150 generates a well-organized result structure 510 from the abstract query plan according to the one-to-one and one-to-many relationships among the logical fields included in the query. Each node of the abstract query plan corresponds to a node of result structure 510. The abstract query plan specifies how data retrieved for the abstract query are related by one-to-one and one-to-many relationships. Result structure 510 captures these relationships and uses them to produce a set of well organized query results.

In one embodiment, the data repository abstraction component 548 is extended to include relations section 550 describing the one-to-one and one-to-many relationships between the logical fields. For example, relations data 555 illustrates the one-to-one relationship between "patient ID" logical field $506_1$ and the "patient name" logical field $506_2$. Additionally, the relations data 557 and 559 illustrate the one-to-many relationship between a patient ID, and the glucose and insulin logical fields ($506_3$ and $506_4$).

In addition, in a particular embodiment, the runtime component 150 may be configured to detect a query that that would lead to a Cartesian product in the query results. Generally, a Cartesian product joins two data sets by joining every item from the first data set with every item of data from the second data set. Using data from Table I as an example, the Cartesian product of the test results joined to the Patient ID is shown below:

TABLE I

| Original Results | | | Cartesian Product | | |
|---|---|---|---|---|---|
| Patient ID | Last Name | Test Results | Patient ID | Last Name | Test Results |
| 1 | Smith | 23 | 1 | Smith | 23 |
| 1 | Smith | 28 | 1 | Smith | 28 |
| 1 | Smith | 21 | 1 | Smith | 21 |

TABLE I-continued

| Original Results | | | Cartesian Product | | |
|---|---|---|---|---|---|
| Patient ID | Last Name | Test Results | Patient ID | Last Name | Test Results |
| 2 | Jones | 33 | 1 | Smith | 33 |
| 2 | Jones | 35 | 1 | Smith | 35 |
| | | | 2 | Jones | 33 |
| | | | 2 | Jones | 35 |
| | | | 2 | Jones | 23 |
| | | | 2 | Jones | 28 |
| | | | 2 | Jones | 21 |

The Cartesian product table loses the relationships between the "patient ID" data and the "test results" data, rendering the results meaningless. In such a case, the user may be notified or provided feedback, such as a warning flag, which informs the requesting entity that a Cartesian product has been detected. Steps may then to be taken to mitigate the undesirable effects of the Cartesian product. In one embodiment, the requesting entity (e.g., the user) may modify the query as appropriate. In another embodiment, the result set may be modified by, for example: (i) introducing null values into the Cartesian product to avoid duplicated result fields in the query result, (ii) serializing result fields having duplicated result values in the Cartesian product into single lines, and (iii) resolving the Cartesian product to present the query result in a summarizing form. Detailed examples of modifying query results are discussed in a commonly owned co-pending U.S. patent application, Ser. No., 10/932,709, filed Sep. 2, 2004, entitled "Cartesian Product Detection", which is incorporated herein by reference in its entirety.

Continuing with the exemplary abstract query 502 illustrated in FIG. 5, the well-organized result structure 510 illustrates the well-organized data structure generated at step 404. As illustrated, the well-organized result structure 510 includes logical fields from the abstract query broken into three sub-nodes, stored using a tree structure. At the root node is the patient ID logical field $512_1$. Beneath it are two logical field nodes $512_2$ and $512_3$. Each node may form the basis of a one-to-one or one-to-many relationship with another node. In this case, the edges between the root node $512_1$ and nodes $512_2$ and $512_3$ represent a one-to-many relationship with the root node.

In one embodiment, the node containing the model entity is used as the root node for the well-organized result temporary data structure 510. Sub nodes $512_2$ and $512_3$ each descend from the root node $512_1$. The hierarchal relationship may descend to an arbitrary depth depending on the number of field-to-field relationships and the number of one-to-one and one-to-many relationships between logical fields present for a particular abstract query.

Referring again to operations 400 in FIG. 4, at step 406, the runtime component 150 generates a resolved query executed against the underlying database 214 to retrieve a set of query results. At step 408, the data stored in the well-organized results structure is populated with results data according to the relationships one-to-one and one-to-many relationships. Once query results are retrieved, the well-organized results data structure 510 may be populated with the appropriate query results data. Populating the well-organized results structure 510 directly follows the tree-type structure of the results structure 510. Each node 512 corresponds to a node from the abstract query plan. Further, each node from the abstract query plan indicates a data source used to retrieve data for that node. Accordingly, each node 512 of the well-organized results structure 510 is populated with query results using data from the data source indicated in the corresponding node of the abstract query plan.

For an SQL query, the initial results retrieved from step 406 will be a set of rows stored in a results table (e.g., table 409). As illustrated in FIG. 5, the well-organized results structure specifies the ID and name fields as part of the root node $512_1$. These two logical fields are defined by field specifications $506_1$ and $506_2$. From the root node $512_1$, the runtime component 150 may generate a resolved query corresponding to node $512_1$ like the following:

Resolved Query 1:
    Select demographic.patient_ID, demographic.name order by Demographic. Patient ID as TT1

The results of this query are stored in a temporary table $516_1$ named TT1. Similarly, the runtime component 150 may generate resolved query statements for the nodes $512_2$ and $512_3$ like the following stored in temporary tables $516_2$ and $516_3$:

Resolved Query 2:
    Select tests.patient_id, test.result where test.type=glucosetest and test.patient_ID=TT1. patient_ ID order by test.patient_ID as TT2

Resolved Query 3:
    Select tests.patient_id, test.result where test.type=insulintest AND test.patient_ID=TT1. patient_ ID order by test.patient_ID as TT3

Intermediate results data 514 corresponds to the well-organized results data structure 510. The former stores the data actually retrieved, where the latter reflects the logical fields and relationships corresponding to the data. Each row of the results data generated from resolved query stored in a results table 516 represents a "one" side of a one-to-many relationship. Further, each row includes a reference to each child node from sub queries $512_2$ and $512_3$; the "many" side of the one to many relationship.

At step 410, the well-organized results structure is provided to an output formatter. In one embodiment, the output formatter 530 may take the intermediate results data 514 and generate a set of HTML documents returned to the user for display by browser 122. For example, output display 575 illustrates an HTML document populated with the well-organized query results. Accordingly, each row includes the "one" element of a one-to-many relationship only once, and each of the "ones" corresponds to multiple test results displayed for each patient. In another embodiment, the intermediate results data 514 and may be used as input by another process, such as a statistical analysis package.

Note, however, that although the above description shows the abstract query plan used to generate multiple resolved queries, in some embodiments, the runtime component 150 generates a single query from the abstract query plan and then manipulate the results to create a set of well-organized query results during step 408 of operations 400. For example, the runtime component 150 could resolve abstract query 502 into a single resolved query like the following:

Resolved Query 4: Single Query Example

Select distinct T1.id, name, T2.result as "test1" −1 as "test2" from demographic T1 left outer join
(select T2.* from test T2 where type=glucosetest) as T2 on T1.id=T2.id union
select distinct T1.id, name, −1 as "test 1", T3.result as "test 2" from demographic T1 inner join (select t3.*from test t3 where type=insulintest) as T3 on T1.id=T3.id This example query collapses steps 408 and 410 into a single step, retrieving all the data for each patient, and then for each test (i.e., each many relationship) separately. The output of this query for the "Jane Smith" patient is shown in Table IV:

TABLE IV

SQL Query Results

| Patient ID | Name | Glucose Results | Insulin Results |
|---|---|---|---|
| 1 | Smith, Jane | 23 | −1 |
| 1 | Smith, Jane | 28 | −1 |
| 1 | Smith, Jane | 21 | −1 |
| 1 | Smith, Jane | −1 | 5 |
| 1 | Smith, Jane | −1 | 20 |

This method may be extended to any number of result fields by adding additional "union" statements to the concrete query statement. The "−1" value is used as a placeholder, assuming that no valid test result could be a negative number (otherwise Null values or NaN values could be used as an appropriate placeholder).

Figure 6:
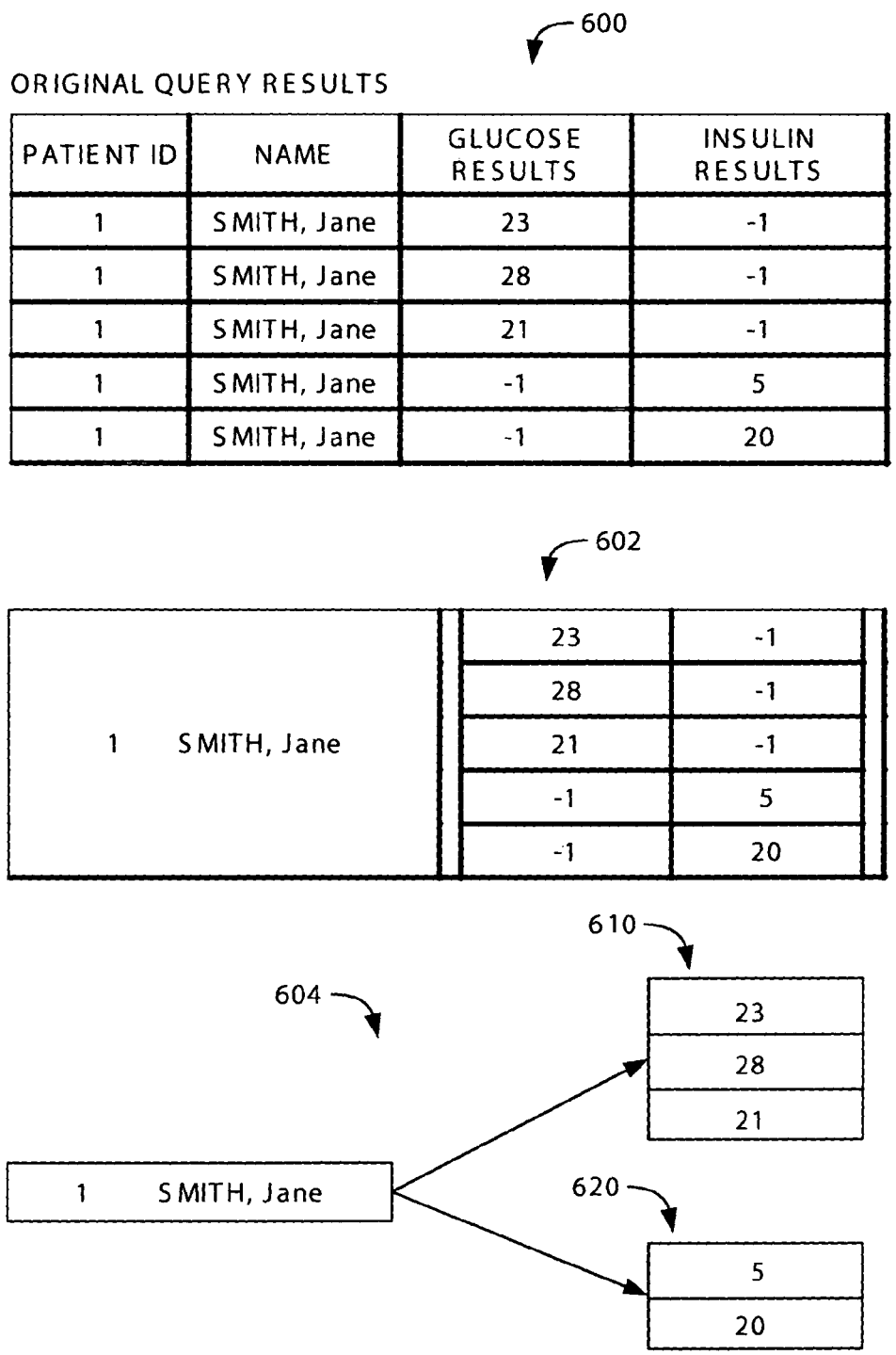
FIG. 6 illustrates a set of query results in the form of a row set transformed into a set of well organized user results, according to one embodiment of the invention.

The above example, the SQL query is constructed to insert placeholder results into the query. The data assembly and output formatting step (step 408 and 410) would read each row and merge identical output across each column moving across from a root entry to data retrieved for other logical fields included in the query. FIG. 6 illustrates the operations of the output formatter 530 on the SQL query results shown in Table IV. First, the all the root rows ("Jane Smith") are collapsed into a root entry, as shown by table 602. Next, moving across the columns of the query results, the first three glucose results would form a first child node 610 and the next two rows would form a second child node 620 of the well organized results 604. This method allows the underlying DBMS system to optimize the query for processing and further avoids any problems with updates that may occur between queries.

Conclusion

Embodiments of the present invention present a user with query results that remove unneeded duplication of data included in a flat table of rows and columns. Further, well organized query results carry the data abstraction model through the entire database query process and present query results according to the intuitive relationships between data understood by users of an abstract database. Rather than use a logical representation of data to compose an abstract query and receive only a table of rows and columns in response, users are presented with query results formatted according to data relationships between logical fields. Further, when query results are used as input data to another application, (e.g., a statistical analysis process) the well-organized results provide more precise input to such an application.

What is claimed is:

1. A method of generating a set of well organized query results, comprising:
receiving, from a requesting entity, an abstract query composed from a plurality of logical fields, wherein each logical field specifies (i) a name used to identify the logical field, and (ii) an access method that maps the logical field to data in an underlying database;
retrieving a first set of query results for the abstract query from the underlying database, wherein retrieving the first set of query results, comprises generating, from the abstract query, an intermediate representation of the abstract query that indicates (i) a set of logical fields included in the abstract query, (ii) an indication of data sources within the database mapped to by the set of logical fields, and (iii) a set of one-to-one and one-to-many relationships specified for the plurality of logical fields; and further comprising, generating, from the intermediate representation, a resolved query issued against the database;
transforming the first set of query results into a second set of query results wherein the second set of query results are organized according to the set of one-to-one and one-to-many relationships specified for the plurality of logical fields; and
providing the second set of query results to an output formatter configured to display the query results to the requesting entity according to the one-to-one and one-to-many relationships.

2. The method of claim 1, wherein generating, from the intermediate representation, the resolved query of the database, comprises generating an SQL query, and wherein the database is a relational database.

3. The method of claim 2, further comprising:
detecting, prior to executing the resolved query against the relational database, whether the resolved query would produce a Cartesian product in the first set of query results; and, if detected,
presenting a user with an indication that the resolved query will produce a Cartesian product if issued against the relational database.

4. The method of claim 3, wherein the abstract query includes an indication of one-to-one or one-to-many relationships between the logical fields included in the abstract query.

5. The method of claim 1, wherein the output formatter comprises an application configured to generate a markup code representation of the second set of query results capable of being displayed by an application operated by the requesting entity.

6. A method of processing an abstract query, comprising:
providing a data abstraction layer comprising (i) a plurality of logical fields, wherein each logical field specifies an access method that maps the logical field to data in an underlying database; (ii) an indication of one-to-one and one-to many relationships between the logical fields included in the plurality of logical fields;
receiving, from a requesting entity, the abstract query composed from the plurality of logical fields;
generating a data structure that indicates the one-to-one and one-to-many relationships among the plurality of logical fields included in the abstract query;
retrieving a first set of query results for the abstract query from the underlying database;
transforming the set of query results into a well organized set of query results according to the one-to-one and one-to-many relationships indicated by the data structure; and
providing the second set of query results to an output formatter configured to format the query results according to the one-to-one and one-to-many relationships indicated by the data structure, wherein the output formatter comprises an application configured to generate a markup code representation of the second set of query results capable of being displayed by an application operated by the requesting entity; and
returning the formatted query results to the requesting entity.

7. The method of claim 6, wherein generating, from the intermediate representation, a resolved query of the database, comprises generating an SQL query, and wherein the database is a relational database.

8. The method of claim 7, further comprising:
detecting, prior to executing the resolved query against the database, whether the resolved query would retrieve produce a Cartesian product in the fist set of query results; and, if detected,
presenting the user with an indication that the resolved query will produce a Cartesian product if issued against the relational database.

9. A computer-readable storage medium containing a program which performs operations, comprising:
accessing a data abstraction layer comprising (i) a plurality of logical fields, wherein each logical field specifies an access method that maps the logical field to data in an underlying database; (ii) an indication of one-to-one and one-to many relationships between the logical fields included in the plurality of logical fields;
receiving, from a requesting entity, an abstract query composed from the plurality of logical fields;
generating a data structure that indicates the one-to-one and one-to-many relationships among the plurality of logical fields included in the abstract query;
retrieving a first set of query results for the abstract query from the underlying database;
transforming the set of query results into a well organized set of query results according to the one-to-one and one-to-many relationships indicated by the data structure; and
providing the second set of query results to an output formatter configured to format the query results according to the one-to-one and one-to-many relationships indicated by the data structure; and
returning the formatted query results to the requesting entity.

* * * * *